United States Patent
Winnacker et al.

(10) Patent No.: US 8,042,572 B2
(45) Date of Patent: Oct. 25, 2011

(54) CONTROLLABLE PRESSURE-REDUCING VALVE AND DEVICE FOR THE GENERATION OF PRESSURE CHANGE SIGNALS

(75) Inventors: Helmut Winnacker, Burgdorf (DE); Uwe Draeger, Barsinghausen (DE)

(73) Assignee: Weatherford Energy Services GmbH, Edemissen (DE)

( * ) Notice: Subject to any disclaimer, the term of this patent is extended or adjusted under 35 U.S.C. 154(b) by 644 days.

(21) Appl. No.: 12/221,422

(22) Filed: Aug. 1, 2008

(65) Prior Publication Data
US 2009/0056820 A1      Mar. 5, 2009

(30) Foreign Application Priority Data

Aug. 29, 2007   (DE) .......................... 10 2007 040 997

(51) Int. Cl.
*F16K 47/04*   (2006.01)
(52) U.S. Cl. ................. 137/625.37; 137/625.3; 137/883; 251/127; 175/48
(58) Field of Classification Search .................. 137/883, 137/861, 625.37, 625.3; 251/127; 175/48
See application file for complete search history.

(56) References Cited

U.S. PATENT DOCUMENTS

| | | | |
|---|---|---|---|
| 3,252,480 A | | 5/1966 | Odendahl et al. |
| 3,880,399 A | * | 4/1975 | Luthe ....................... 137/625.37 |
| 4,634,095 A | * | 1/1987 | Taylor ....................... 137/625.37 |
| 5,615,708 A | * | 4/1997 | Barron ....................... 137/625.3 |
| 5,673,751 A | | 10/1997 | Head et al. |
| 5,947,801 A | * | 9/1999 | Weber ........................... 451/303 |
| 5,963,138 A | | 10/1999 | Gruenhagen |
| 6,615,868 B2 | | 9/2003 | Ueki |
| 7,455,115 B2 | * | 11/2008 | Loretz et al. .................. 251/127 |

FOREIGN PATENT DOCUMENTS

| | | |
|---|---|---|
| DE | 1 107 471 | 5/1961 |
| DE | 1 147 450 | 4/1963 |
| DE | 32 15 224 | 11/1983 |
| DE | 37 44 730 | 4/1989 |
| EP | 0 744 527 | 11/1996 |
| GB | 2 087 951 | 6/1982 |
| GB | 2 213 286 | 8/1989 |
| WO | WO 2004/109171 | 12/2004 |

OTHER PUBLICATIONS

British Search Report dated Dec. 9, 2008.

* cited by examiner

*Primary Examiner* — Kevin Lee
(74) *Attorney, Agent, or Firm* — Collard & Roe, P.C.

(57) ABSTRACT

A controllable pressure reducing valve has a housing which includes an inner chamber extending in the direction of a longitudinal axis and an inlet opening and an outlet opening. The inlet opening and the outlet opening open into the inner chamber at an axial relative distance. The inner chamber includes between the mouths of the inlet opening and the outlet opening at least one annular wall having a cylindrical valve bore. An axially movable valve body which is arranged in the inner chamber, extends through the valve bore and has a piston-type portion guided in the valve bore and adapted to close the valve bore. The piston-type portion includes at least one control recess bounded by a control step which extends in axial direction and in circumferential direction and combines with an edge of the valve bore to form a controllable valve opening.

32 Claims, 3 Drawing Sheets

CONTROLLABLE PRESSURE-REDUCING VALVE AND DEVICE FOR THE GENERATION OF PRESSURE CHANGE SIGNALS

CROSS REFERENCE TO RELATED APPLICATIONS

Applicants claim priority under 35 U.S.C. §119 of German Application No. 10 2007 040 997.6 filed Aug. 29, 2008.

FIELD OF THE INVENTION

This invention relates to a controllable pressure-reducing valve for reducing fluid pressure, in particular for reducing the pressure of the drilling fluid in a mud pump supply conduit connected to drill pipes.

BACKGROUND OF THE INVENTION

From DE 1 107 471 A there is known a multistage controllable pressure reducing valve for reducing fluid pressure, which is intended primarily for feed water or the injection of water vapor. The pressure reducing valve has a housing with a longitudinally extending inner chamber, an inlet opening and an outlet opening and with a plurality of annular walls which are arranged between the inlet opening and the outlet opening, are separated from one another by housing recesses and contain coaxial valve openings. Extending through the valve openings is a spindle guided in the valve openings in the manner of a piston and including milled recesses extending in the longitudinal direction of the spindle and determining the control characteristic. The known configuration of the pressure reducing valve is only suitable for use with pure water since particles of dirt may accumulate in the milled recesses and impair the movability of the spindle. Furthermore, the longitudinally extending milled recesses limit the control range appreciably.

Other pressure reducing valves as known, for example, from DE 32 15 224 C2 and DE 37 44 730 C1, have a valve piston arranged in a housing bore for axial movement and including annular recesses capable of exposing valve openings opening radially into the valve bore. To reduce energy by vortical circulation, the valve openings in the housing are additionally surrounded by annularly arranged throttling devices. These valve configurations are likewise only suitable for use with pure liquids which cannot clog the narrow throttle openings.

Furthermore, there is known from EP 0 744 527 B1 an apparatus for the transmission of data present above ground to a data receiving device below ground in a borehole, wherein a bypass conduit discharging into the mud pit and including a shut-off device actuatable by a fluid pressure drive is connected to the supply conduit of a mud pump driven at a constant output. Connected downstream of the shut-off device is a throttle which reduces the pressure energy of the drilling fluid escaping from the supply conduit with the shut-off device open. To transmit data to a downhole data receiving device, the shut-off device is actuated in the opening direction during uninterrupted drilling operations, whereby the flow rate of the drilling fluid in the drill string is reduced. The variation of the flow rate over time produces a signal capable of being detected by the downhole data receiving device. Depending on the manner of actuation and design of the shut-off device, a pulse-like pattern can be imposed on the volumetric flow variations, and by variation of the pulse pattern it is possible to produce as a binary sequence coded signals which serve to control components of the downhole system.

However, the reduction to practice of the above-described method of signal generation is fraught with major difficulties because, depending on the operation of a drilling rig, the conditions in the supply conduit of the mud pump may vary widely. At shallow drilling depths the drilling fluid pressure on the drill head is comparatively low as a rule, while the flow rate is quite high. In order to achieve flow rate variations suitable for signal transmission, it is therefore necessary to direct a comparatively large bypass flow into the pit at a low pressure. At large drilling depths the drilling fluid pressure on the drill head is necessarily very high whilst the flow rate is relatively small as a rule. An attendant problem is to let only a limited amount of volumetric flow escape through the bypass conduit and into the mud pit, in spite of the high pressure, which makes it necessary for a corresponding pressure energy of the branched off bypass flow to be reduced. Intermediate states between said extremes must also be negotiated by the shut-off device provided for signal generation.

Another problem presenting itself is the unavoidable loading of the drilling fluid with abrasive solid particles which, on the one hand, may result in severe wear of the shut-off and throttling device and, on the other hand, may also cause clogging and eventual failure of the shut-off and throttling devices.

SUMMARY OF THE INVENTION

Based on this state of the art, it is an object of the present invention to provide a controllable pressure reducing valve which is suitable for reducing the pressure of a drilling fluid used for deep-drilling operations. It is another object of the invention to provide a pressure reducing valve which enables control of the flow rate in a bypass conduit branching off a supply conduit connecting a mud pump to a drill string. Still further, it is an object of the invention to provide a pressure reducing valve which enables an infinitely variable control of the volumetric flow discharged through the pressure reducing valve. It is yet another object of the invention to configure the pressure reducing valve in such a way as to make it wear resistant and to ensure that its function is not adversely affected by solid particles contained in the drilling fluid.

To solve the above-identified objects, according to the invention a controllable pressure reducing valve is provided having a housing which includes an inner chamber extending in the direction of a longitudinal axis and having an inlet opening, downstream of the inlet opening at least one adjustable first pressure reducing stage, and downstream of the first pressure reducing stage a first outlet opening, wherein the inner chamber of the housing accommodates at least one adjustable second pressure reducing stage arranged parallel to the first outlet opening and downstream of the first pressure reducing stage, and wherein downstream of the second pressure reducing stage a second outlet opening is arranged, and both outlet openings are adapted to be closed independently of each other. In an advantageous embodiment, the inner chamber includes between the inlet opening and the outlet opening at least one annular wall with a cylindrical valve bore and an axially movable valve body which extends through the valve bore and has a piston-type portion guided in the valve bore and adapted to close the valve bore, with the piston-type portion including at least one control recess which is bounded by a control step extending in axial direction and in circumferential direction and combines with the edge of the valve bore to form a controllable valve opening.

The pressure reducing valve of the invention enables a precise control of the cross-section of orifice, with the control characteristic being selectable within wide limits. A control is also possible in cases where the cross-sections of orifice are small. Furthermore, the control characteristic may also be influenced by the shape of the control step. This can be an advantage when the drive is designed for valve actuation. A control characteristic advantageous for signal generation can be accomplished if the shape of the control step, when developed, corresponds to the curve shape of a sine function or an exponential function. The control step of the pressure reducing valve extends preferably substantially at right angles to the envelope surface of the piston-type portion. The accumulation of deposits and the formation of a filter cake are thereby avoided. In addition, this contributes to control precision.

Preferably, the piston-type portion of the valve body includes a plurality of, in particular two, control recesses lying side-by-side in circumferential direction and being constructed and arranged in particular symmetrical about the axis. As a result, a pressure balance is achieved in radial direction in the open positions of the pressure reducing valve, so that the friction forces between the valve body and the housing are maintained at a low level.

According to the invention, the control step can be designed such that the valve opening obtained has a cross-section of orifice as compact as possible. A compact cross-section of orifice distinguishes itself in that its circumference is small in relation to the cross-sectional area, the ideal case would be a circular cross-section of orifice. A compact cross-section of orifice of the valve opening is effective in counteracting clogging by solid particles in the pressure fluid and the formation of filter cake.

According to the invention, provision can furthermore be made for the control step to have two diverging portions which extend from one place in the direction of flow. A compact cross-section of orifice of the valve opening is thereby obtained. Preferably, the diverging portions are symmetrical in relation to a plane of symmetry containing the longitudinal axis, and converge in the plane of symmetry. Owing to such a symmetrical configuration, torques acting on the valve body are avoided. Still further, this configuration has proven to be particularly effective for reducing pressure energy by vortical circulation.

In the open positions of the pressure reducing valve, hydrodynamic forces may cause the valve body to be excited into vibrations. To prevent this from occurring, the invention provides for the piston-type portion of the valve body to be guided in the valve body along the entire length of its control stroke. Also, provision may be made for the edge of the valve bore to be formed by a conical surface adjoining the valve bore. This causes the flow to be directed radially inwardly in the open positions of the valve and a vortical circulation to be produced which is in opposition to the direction of flow and has a beneficial effect on energy reduction.

According to a further proposal of the invention, the pressure reducing valve includes a plurality of serially arranged pressure reducing stages wherein each pressure reducing stage includes at least one annular wall with a cylindrical valve bore and a piston-type valve body portion guided in the valve bore and adapted to close the valve bore, said piston-type portion or said valve bore having at least one control recess which is bounded by a control step extending in axial direction and in circumferential direction. Such a configuration enables the pressure reduction to be distributed uniformly to several throttling locations and to keep the loads and wear of the individual stages at a low level, in particular in the presence of major pressure differentials. Moreover, the control action at high pressures and low flow volumes passed is improved by the provision of several stages in series arrangement.

According to a further proposal of the invention, the adaptation to widely differing operating conditions can be enhanced by providing the pressure reducing valve with several groups of serially arranged pressure reducing stages, with a closable outlet opening being provided downstream of each group. Depending on which one of the outlet openings is exposed, it is thereby possible to operate the pressure reducing valve with a different number of serially arranged pressure reducing stages. The number of pressure reducing stages of the individual groups may vary and increase as the distance between the group and the inlet opening increases. In this way, different operating conditions exceeding in number the number of groups are achievable with few groups.

In an advantageous embodiment of the pressure reducing valve of the invention, the housing may be composed of annular housing portions, wherein a first annular housing portion is designed to receive an annular wall with cylindrical valve bore, and a second annular housing portion includes a radial port. In addition, provision may be made for the annular wall with the cylindrical valve bore to be constructed as a separate insert and fabricated in particular from a particularly wear resistant material. To form a housing, first and second annular housing portions may be arranged between end plates which are connected to one another by rod-shaped elements. In this way it is possible to produce housings of pressure reducing valves differing in design and the number of pressure reducing stages by use of a few, uniform components.

According to the invention, the valve body of the throttle valve has a central longitudinal bore which is connected to the inlet opening of the housing. As a result, a pressure induced expansion of the housing caused by an expansion of the valve body in the same direction is balanced out in part, so that even in the presence of high input pressures the slide gap between the valve bore and the piston-type portion of the valve body is not significantly widened which would adversely affect the operating behavior.

Preferably, the valve body is furthermore constructed such as to be substantially pressure balanced in axial direction in order to enable the necessary control forces to be maintained at a low level also at very high pressures. Moreover, the valve body may be formed of a valve spindle and valve sleeves attached thereto, with each of the valve sleeves forming a piston-type portion. In this arrangement, the valve sleeves may be made of a particularly hard and wear resistant material.

The composite design of the valve body provides a simple way of enabling the valve body to be adapted to various valve designs. Also, the valve sleeves can be manufactured economically as repetition work or sintered parts.

The pressure reducing valve of the invention is preferably suited for the generation of pressure change signals adapted to be transmitted to a downhole location in a mud pump supply conduit connected to drill pipes, with the inlet opening of the pressure reducing valve being connected to a bypass conduit branching off the supply conduit of the mud pump, and the outlet opening being connected to a return conduit leading to a mud pit. In this arrangement, the valve body is actuated preferably by a travel-controlled, in particular pneumatic actuator which is controllable by an electropneumatic positioner.

BRIEF DESCRIPTION OF THE DRAWINGS

The present invention will be explained in greater detail in the following with reference to embodiments illustrated in the accompanying drawing. In the drawing.

DETAILED DESCRIPTION OF THE DRAWINGS

Figure 1:
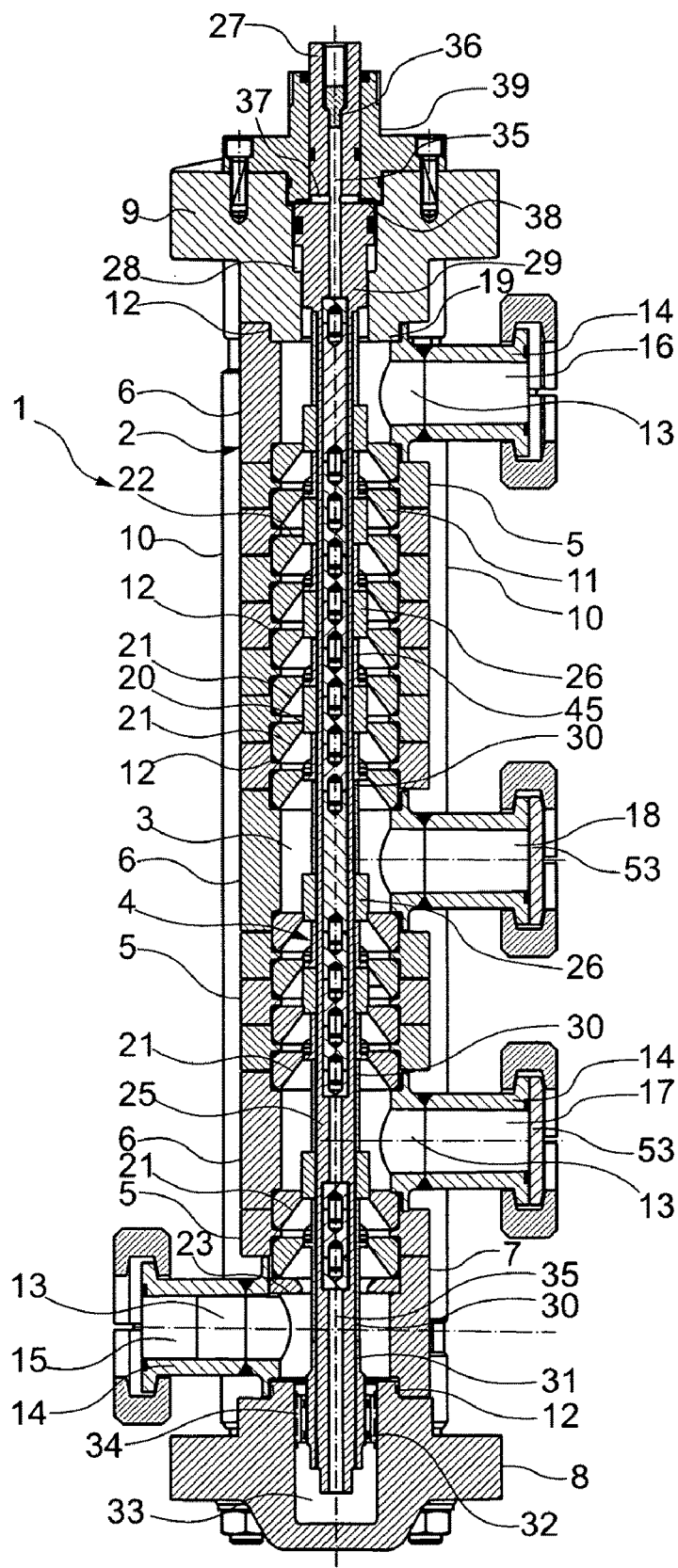
FIG. 1 is a longitudinal sectional view of a pressure reducing valve of the invention.

The pressure reducing valve 1 shown in FIG. 1 includes an elongate housing 2 having an inner chamber 3 and a valve body 4 arranged and guided in the inner chamber 3 for longitudinal displacement. The housing 2 is composed of first annular housing portions 5 and second annular housing portions 6, 7. The housing portions 5, 6, 7 are arranged between two end plates 8, 9 connected to each other through several rod-shaped elements 10. The rod-shaped elements 10 extend on the outside of the housing 2 parallel to its longitudinal center axis, firmly urging the annular housing portions 5, 6, 7 against each other in axial direction. The annular housing portions 5, 6, 7 have in their ends outwardly open annular recesses forming each a shoulder lying within the housing portions 5, 6, 7. Arranged in the relatively facing annular recesses of adjacent first housing portions 5 and adjacent first and second housing portions 5, 6 and 5, 7, respectively, is a respective annular wall 11 constructed as a separate insert. In this arrangement, the annular walls 11 engage within both adjacent annular recesses, centrally locating with their annular envelope surfaces the housing portions 5, 6, 7 relative to one another. In axial direction, the annular walls 11 bear against the shoulders of the housing portions 5, 6, 7 and are sealed against the housing portions 5, 6, 7 by sealing rings 12.

The second annular housing portions 6, 7 are longer in axial direction than the first housing portions 5 and include each a port 13 which opens into inner chamber 3 and is formed by a pipe socket 14 extending radially outwardly. The housing portion 7 is arranged at one end of the housing 2 in a directly adjoining relationship to the end plate 8 and forms the inlet 15 of the pressure reducing valve 1. At the other end of the housing 2, a housing portion 6 is arranged to adjoin the end plate 9 for forming a first outlet 16. For central location, both end plates 8, 9 include annular portions 19 which engage into the annular recesses of the housing portions 7, 6 and are sealed against the housing portions 7, 6 by means of sealing rings 12. Two further outlets 17, 18 are formed by housing portions 6 which are arranged between housing portions 5 and separated from each other by housing portions 5. The segmentation is selected such as to provide between inlet 15 and outlet 17 a total of two, between outlet 17 and outlet 18 a total of four, and between outlet 18 and outlet 16 a total of eight walls 11 held by housing portions 5.

All the walls 11 are alike, including a cylindrical valve bore 20, a conical surface 21 tapering towards the valve bore 20 on its afflux side, and a plane end surface 22 on its efflux side. The conical surface 21 and an adjoining annular chamber within the housing portions 5, 6 combine to form on the afflux sides of the walls 11 annular chambers for passage and vortical circulation of the fluid flowing therethrough. Only in the inlet-side housing portion 7 is an annular throttling disk 23 provided on the afflux side in front of the wall 11 instead of an annular chamber.

The valve body 4 comprises a valve spindle 25 which extends in the longitudinal direction of the inner chamber 3 and carries valve sleeves 26 corresponding in number to the number of walls 11. The valve spindle 25 has an actuating end 27 which extends through a stepped cylinder bore 28 in the end plate 9 and forms a piston portion 29 guided and sealed within the cylinder bore 28. The valve sleeves 26 have an axial length corresponding to the axial distance of the walls 11 and take direct support upon each other where they are situated in the range of action of the walls 11. By means of spacer sleeves 30 and a threaded sleeve 31 arranged at the input end of the spindle, the valve sleeves 26 are held in such a fixed position on the valve spindle 25 that each valve sleeve 26 occupies the same position relative to its associated wall 11.

The threaded sleeve 31 is mounted for displacement in a bushing 32 arranged in the end plate 8 in a bore 33 having one end closed. In its envelope surface the bushing 32 includes longitudinal grooves 34 through which the closed end of the bore 33 is in communication with the inlet 15. The valve spindle 25 is furthermore provided with a longitudinal through bore 35 which within the actuating end 27 is closed pressure-tight by a plug 36. A cross bore 37 intersecting the longitudinal bore 35 opens into an annular chamber 38 which is located on the side of the piston portion 29 close to the actuating end 27 and is bounded in outward direction by a bushing 39 secured to the end plate 9. Sealed and guided for axial movement in the bore of the bushing 39 is the actuating end 27 of the valve spindle 25. By virtue of the described arrangement, the annular chamber 38 is connected to the inlet 15, thereby enabling the piston portion 29 to be acted upon by the inlet pressure to achieve a pressure balance.

Figure 2:
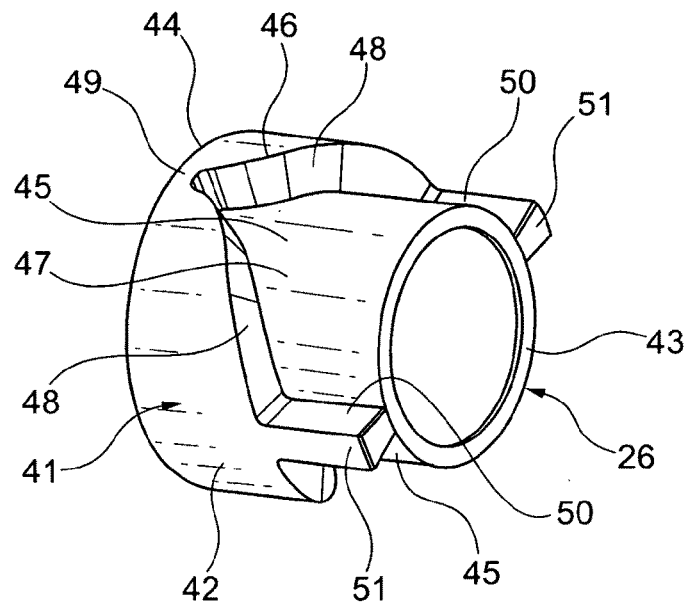
FIG. 2 is a perspective view of a valve sleeve of the pressure reducing valve of FIG. 1.

As becomes apparent from FIG. 2, the valve sleeves 26 have each a piston-type portion 41 with a cylindrical envelope surface 42 extending between the end surfaces 43, 44. The piston-type portion 41 includes two opposite control recesses 45 which are recessed from the envelope surface 42 by sharp-edged control steps 46. The bottom of each control recess 45 is bounded by a coaxial cylinder surface 47 which extends as far as to the end surface 43 and has a radius of curvature smaller than the radius of curvature of the envelope surface 42. Both control recesses 45 are symmetrical relative to an axial center plane lying between them and relative to an axial center plane perpendicular thereto.

The control step 46 of each control recess 45 has two diverging first portions 48 extending from a constriction 49 situated close to the end surface 44 in axial direction and in circumferential direction. These portions 48 extend along a curved path whose curvature decreases as the distance from the constriction 49 increases. When developed, the run of this path may follow an exponential function, a sine function or some other principle. Adjoining the portions 48 are portions 50 of the control step 46 which extend parallel to the longitudinal axis of the valve sleeve 26. Between the portions 50 of the two opposite control recesses 45 there extends a narrow rib-shaped area 51 of the portion 41 which serves to guide the valve sleeve 26 in the open position of the pressure reducing valve. In radial direction the control steps 46 extend substantially perpendicular to the planes touching the envelope surface 42 and the control step 46 at the respective locations. As a result, the control step 46 forms with the envelope surface 42 a sharp-edged, substantially right-angled control edge along its full length. This control edge configuration enables a precise control of the cross-section of orifice to be accomplished in the pressure reducing valve and prevents the formation of filter cake and other interfering deposits.

Figure 3:
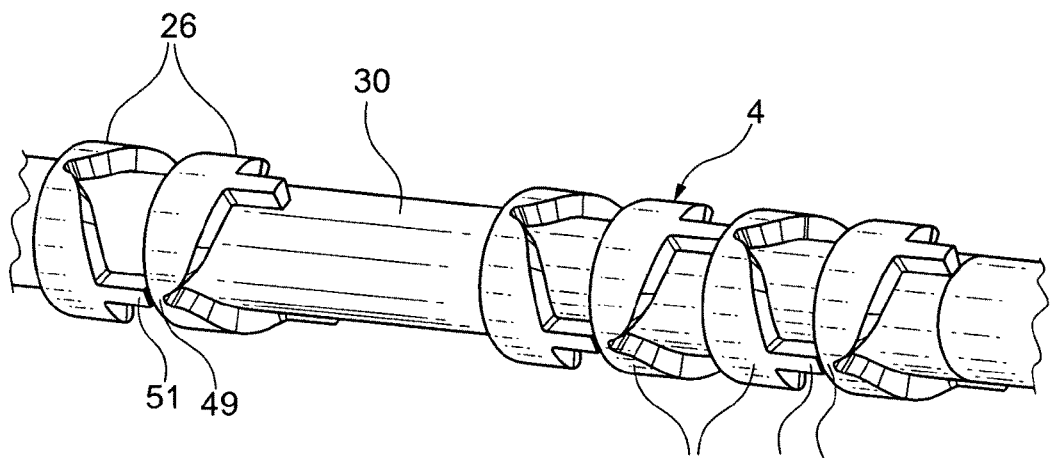
FIG. 3 is a perspective view of a portion of the valve body of the pressure reducing valve of FIG. 1.

FIG. 3 shows a section of the valve body 4 with a plurality of valve sleeves 26 arranged serially in like directions. The identical valve sleeves 26 have their end surfaces 43, 44 in abutting engagement and are each turned through an angle of 90° relative to each other so that the constriction 49 of one valve sleeve 26 comes to lie adjacent to the rib-shaped area 51 of the adjoining valve sleeve 26. This improves the guiding of the valve body 4 in the valve bores 20 of the walls 11, and the fluid flowing through the valve in the open position is forced to form partial currents extending in circumferential direction, and hence to produce a stronger vortical circulation.

FIG. 1 shows the pressure reducing valve 1 prepared for an application in which use is made of all the pressure reducing stages which are each comprised of a wall and a valve sleeve 26. This is appropriate in cases where a high pressure differential between inlet and outlet has to be negotiated. To ensure that all the pressure reducing stages are passed one after the other, the outlets 17, 18 are closed by a respective cover plate 53. Alternatively, shutoff valves could be provided at the outlets.

The valve body 4 is shown in the closed position in the drawing. In this position, the valve sleeves 26 with their annularly closed areas adjoining the end surfaces 44 acted upon by the fluid are within the valve bores 20 of the walls 11.

To open the pressure reducing valve 1, the valve body 4 is moved in the direction of the end plate 8. As this occurs, at the beginning of the opening stroke the control steps 46 emerge from the valve bores 20 only at the locations 49 so that each two small compact valve openings are formed on the afflux sides of the walls 11 through which the pressure fluid conveyed to the inlet is allowed to pass and flow into the control recesses 45 expanding in the direction of flow. In the control recesses 45 the pressure fluid flows through the valve bores 20 to the afflux side of the next wall and finally to the outlet 16. The size of the valve openings formed is identical on all the walls 11. After a brief opening period, there develops on each wall 11 a substantially identical pressure differential which corresponds to the total pressure differential between the inlet 15 and the outlet 16 divided by the number of pressure reducing stages. When the valve body is moved further in the direction of the end plate 8, increasingly longer portions of the control steps 46 emerge from the valve bores 20, whereby the valve openings for passage of the pressure fluid become continuously larger due to the diverging run of the control steps 46. The volumetric flow passing through the pressure reducing valve at a given pressure differential increases as a function of the enlargement of the valve openings. The volumetric flow reaches its maximum level when the diverging first portions 48 of the control steps 46 are outside the valve bores 20 of the walls 11. Hence it shows that the volumetric flow is dependent on the opening stroke of the valve body 4 and can be varied by selectively controlling the opening stroke. By varying the shape of the control steps 46 it is furthermore possible to vary the ratio of volumetric flow to opening stroke.

Another possibility of influencing the volumetric flow at a given pressure differential is afforded by the outlets 17 and 18. Depending on the arrangement of the outlets 17, 18, the existing pressure reducing stages are divided into three groups of different size, so that also a smaller number of pressure reducing stages and accordingly a lower throttling effect can be put to use. For example, if outlet 16 is closed and outlet 18 is opened instead, the fluid passes only through six instead of 14 throttling stages. Owing to the correspondingly lower throttle resistance, a higher volumetric flow passing through the pressure reducing valve results at a like input pressure.

Figure 4:
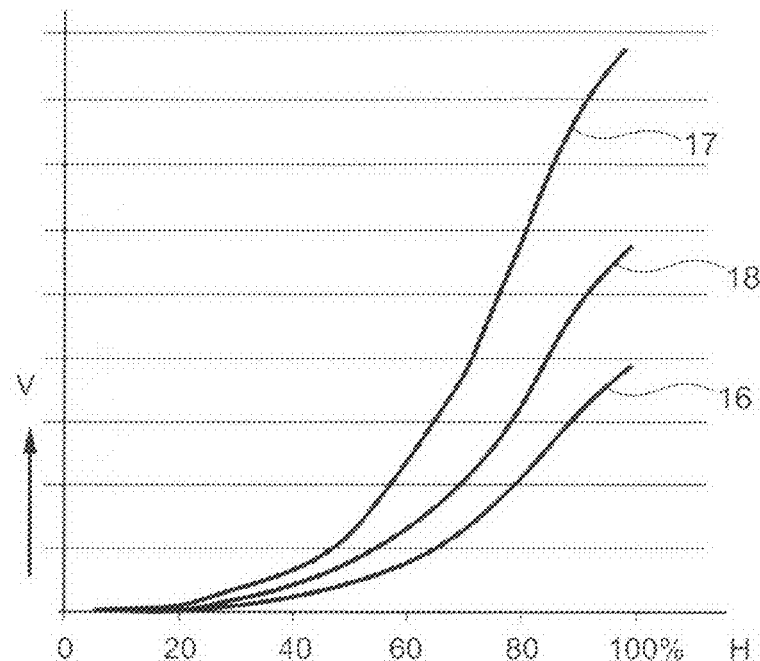
FIG. 4 is a graph showing the relationship of volumetric flow to opening stroke of the pressure reducing valve of FIG. 1.

FIG. 4 shows a graph in which the volumetric flow V passing through the pressure reducing valve 1 at a given pressure differential is shown at a constant pressure differential between inlet and outlet as a function of the opening stroke H of the valve body 4 for the three outlets 16, 17, 18. As becomes apparent, when using the outlet 17 for example, the volumetric flow is more than double the volumetric flow produced by use of the outlet 16.

Figure 5:
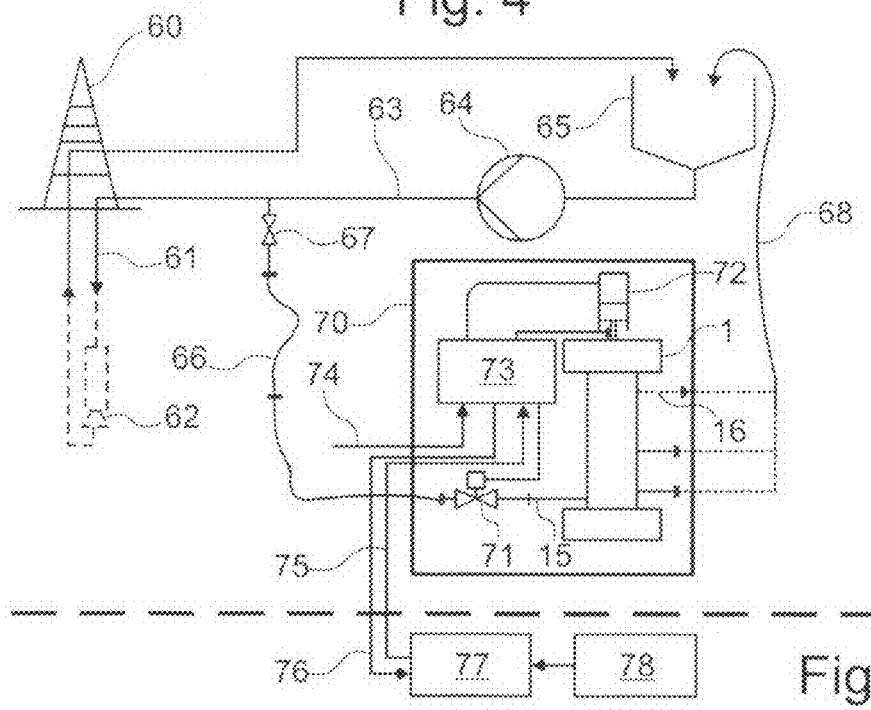
FIG. 5 is a schematic illustration of a deep drilling apparatus having a device for signal generation using the pressure reducing valve of FIG. 1.

FIG. 5 shows a preferred application of the pressure reducing valve described in a device for the generation of signals which in deep drilling apparatus can be transmitted by means of the drilling fluid from above ground to a receiving device provided in a borehole below ground. Schematically shown are a derrick 60 from which a drill string 61 extends in a borehole to a drill bit 62 below ground. The drill string 61 is connected to the supply conduit 63 of a mud pump 64 which aspirates drilling fluid from a pit 65 and delivers it through the drill string 61 to the drill bit 62 at a pressure dependent on the drilling depth. The drilling fluid exits at the drill bit 62 into the borehole and flows through it back to the derrick 60 where it is collected, cleaned and returned to the pit 65. Branching off the supply conduit 63 is a bypass conduit 66 which is closable by a shutoff valve 67. The bypass conduit 66 is connected to a signal generating device 70 accommodated in a mobile container. The signal generating device 70 comprises a pneumatically controlled input valve 71, a pressure reducing valve 1 corresponding to the embodiment described and having its inlet 15 connected to the outlet of the input valve 71, a pneumatic linear drive 72 for actuating the pressure reducing valve 1, and an electropneumatic control device 73 adapted to control the input valve 71 and the linear drive 72. The control device 73 is connected to an air supply 74 and, via lines 75, 76, to an electrical control circuitry 77 which is arranged outside the container in an explosion-proof area and is controllable by a computer 78. The input valve 71 is connected to the bypass conduit 66, and the outlet 16 of the pressure reducing valve 1 is connected to a return conduit 68 leading to the pit 65.

In order to generate during drilling operations signals which are transmitted by the drilling fluid to a downhole receiving device with desired clearness, the shutoff valve 67 and the input valve 71 are opened. Then the pressure reducing valve 1 is opened and closed cyclically in time-controlled manner by the control device 73 and in response to the control signals from the computer 78 and the control circuitry 77. When the pressure reducing valve 1 is opened, a partial current escapes from the supply conduit 63, flowing through the bypass conduit 66 of the pressure reducing valve 1 and the return conduit 68 into the pit 65, whereby the volumetric flow conveyed to the drill string 61 is reduced correspondingly. Because of the substantially constant flow resistance of the drill string 61 and the drill bit 62, the reduction in volumetric flow conveyed to the drill string 61 results in a pressure change in the supply conduit 63 which is transmitted downhole by the drilling fluid. Owing to the cyclic activation of the pressure reducing valve 1 in a timed sequence, pressure pulse signals for data transmission to a downhole location can be modulated in this way. Appropriate modulating methods are known in the art.

The opening and closing cycle of the pressure reducing valve 1 is preferably controlled for signal generation in such a way that the change in volumetric flow variation and hence also the change in pressure take on a sinusoidal characteristic. This characteristic produces fewer harmonics and therefore does not adversely affect a simultaneously possible signal transmission in the opposite direction which operates with a higher frequency band. It will be understood, however, that apart from a sinusoidal opening characteristic numerous other opening characteristics, for example, rectangular or trapezoidal volumetric flow variations over time are possible with the pressure reducing valve 1 described. Whichever applies, a significant advantage of the pressure reducing valve is its property of controlling the volumetric flow passing through the pressure reducing valve precisely in dependence upon the opening stroke and of translating predetermined signal shapes into corresponding pressure variations.

Another feature of the pressure reducing valve essential for its use for signal generation during deep drilling operations is the possibility for the number of effective pressure reducing stages to be ideally adapted to the different supply pressures and delivery rates of the drilling fluid by selecting a different outlet for the connection of the return conduit 68. In addition, the construction of the pressure reducing valve from a comparatively small number of identical components makes it easy to reduce or increase the existing number of pressure reducing stages and also to vary the number of outlets or the number of pressure reducing stages associated with an outlet. This enables the pressure reducing valve of the invention to be adapted to a plurality of different applications with little effort.

What is claimed is:

1. A controllable pressure reducing valve for reducing the pressure of fluids, having a housing which includes an inner chamber extending in the direction of a longitudinal axis and having an inlet opening, downstream of the inlet opening at least one adjustable first pressure reducing stage, and downstream of the first pressure reducing stage a first outlet opening, wherein the inner chamber of the housing accommodates at least one adjustable second pressure reducing stage arranged parallel to the first outlet opening and downstream of the first pressure reducing stage, and wherein downstream of the second pressure reducing stage a second outlet opening is arranged, and both outlet openings are adapted to be closed independently of each other.

2. The pressure reducing valve according to claim 1, wherein at least one adjustable pressure reducing stage is formed by at least one annular wall arranged in the housing and having a cylindrical valve bore and an axially movable valve body which is arranged in the inner chamber, extends through the valve bore and has a piston-type portion guided in the valve bore and including a control recess combining with an edge of the valve bore to form a controllable valve opening.

3. The pressure reducing valve according to claim 2, wherein the piston-type portion includes two control recesses, said control recesses lying side-by-side in circumferential direction and being arranged symmetrical about the axis.

4. The pressure reducing valve according to claim 2, wherein the control recess is bounded by a control step extending in axial direction and in circumferential direction, said control step being configured such that the valve opening obtained has a compact cross-section of orifice.

5. The pressure reducing valve according to claim 4, wherein the control step has two diverging portions which are symmetrical in relation to a plane of symmetry containing the longitudinal axis and converge in the plane of symmetry.

6. The pressure reducing valve according to claim 4, wherein the control step includes a portion which, when developed, corresponds to the curve shape of a sine function or an exponential function.

7. The pressure reducing valve according to claim 2, wherein the piston-type portion of the valve body is guided in the valve bore along the entire length of its control stroke.

8. The pressure reducing valve according to claim 2, wherein a conical surface adjoins an edge of the cylindrical valve bore.

9. The pressure reducing valve according to claim 1, wherein the housing is composed of first and second annular housing portions, and wherein the first annular housing portion includes an annular wall with cylindrical valve bore and the second annular housing portion includes a radial port.

10. The pressure reducing valve according to claim 9, wherein the annular wall with the cylindrical valve bore is constructed as a separate insert and is arranged between two annular housing portions.

11. The pressure reducing valve according to claim 9, wherein the annular housing portions are arranged between end plates which are connected to one another by rod-shaped elements.

12. The pressure reducing valve according to claim 2, wherein the valve body has a longitudinal bore which is connected to the inlet opening of the housing.

13. The pressure reducing valve according to claim 2, wherein the valve body is pressure balanced in axial direction.

14. The pressure reducing valve according to claim 2, wherein the valve body includes a valve spindle and valve sleeves attached to the valve spindle, with each of the valve sleeves forming a piston-type portion.

15. The pressure reducing valve according to claim 14, wherein the valve sleeves are made of a wear resistant material.

16. A device for the generation of pressure change signals, which are adapted to be transmitted to a downhole location, in a mud pump supply conduit connected to drill pipes by use of a controllable pressure reducing valve having a housing which includes an inner chamber extending in the direction of a longitudinal axis, an inlet opening, downstream of the inlet opening at least one adjustable first pressure reducing stage, and downstream of the first pressure reducing stage a first outlet opening, wherein the inner chamber of the housing accommodates at least one adjustable second pressure reducing stage, wherein the second pressure reducing stage is connected downstream of the first pressure reducing stage parallel to the first outlet opening, and that downstream of the second pressure reducing stage a second outlet opening is arranged, wherein both outlet openings are adapted to be closed independently of each other, and wherein the inlet opening of the pressure reducing valve is connected to a bypass conduit branching off the supply conduit, and optionally one of said outlet openings is connected to a mud conduit leading to a mud pit.

17. The device according to claim 16, wherein the valve body is movable by a travel-controlled actuator.

18. The device according to claim 17, wherein control of the actuator is performed by an electropneumatic positioner.

19. The device according to claim 16, comprising a pressure reducing valve wherein at least one adjustable pressure reducing stage is formed by at least one annular wall arranged in the housing and having a cylindrical valve bore and an axially movable valve body which is arranged in the inner chamber, extends through the valve bore and has a piston-type portion guided in the valve bore and including a control recess combining with an edge of the valve bore to form a controllable valve opening.

20. The device according to claim 19, wherein the piston-type portion includes two control recesses, said control recesses lying side-by-side in circumferential direction and being arranged symmetrical about the axis.

21. The device according to claim 19, wherein the control recess is bounded by a control step extending in axial direction and in circumferential direction, said control step being configured such that the valve opening obtained has a compact cross-section of orifice.

22. The device according to claim 20, wherein the control step has two diverging portions which are symmetrical in relation to a plane of symmetry containing the longitudinal axis and converge in the plane of symmetry.

23. The device according to claim 20, wherein the control step includes a portion which, when developed, corresponds to the curve shape of a sine function or an exponential function.

24. The device according to claim 19, wherein the piston-type portion of the valve body is guided in the valve body along the entire length of its control stroke.

25. The device according to claim 19, wherein a conical surface adjoins an edge of the cylindrical valve bore.

26. The device according to claim 19, wherein the valve body has a longitudinal bore which is connected to the inlet opening of the housing.

27. The device according to claim 19, wherein the valve body is pressure balanced in axial direction.

28. The device according to claim 19, wherein the valve body includes a valve spindle and valve sleeves attached to the valve spindle, with each of the valve sleeves forming a piston-type portion.

29. The device according to claim 28, wherein the valve sleeves are made of a wear resistant material.

30. The device according to claim 16, wherein the housing is composed of first and second annular housing portions, and wherein the first annular housing portion includes an annular wall with cylindrical valve bore and the second annular housing portion includes a radial port.

31. The device according to claim 30, wherein the annular wall with the cylindrical valve bore is constructed as a separate insert and is arranged between two annular housing portions.

32. The device according to claim 30, wherein the annular housing portions are arranged between end plates which are connected to one another by rod-shaped elements.

* * * * *